United States Patent [19]

York

[11] Patent Number: 4,462,077
[45] Date of Patent: Jul. 24, 1984

[54] TRACE FACILITY FOR USE IN MULTIPROCESSING ENVIRONMENT

[75] Inventor: Harold L. York, Middletown, N.J.

[73] Assignee: Bell Telephone Laboratories, Incorporated, Murray Hill, N.J.

[21] Appl. No.: 391,699

[22] Filed: Jun. 24, 1982

[51] Int. Cl.³ .............................................. G06F 11/00
[52] U.S. Cl. .................................... 364/300; 364/200
[58] Field of Search ....................... 364/200, 300, 900

[56] References Cited

U.S. PATENT DOCUMENTS

| 3,659,272 | 4/1972 | Price | 364/200 |
| 3,707,725 | 12/1972 | Dellheim | 364/300 |
| 4,205,370 | 5/1980 | Hirtle | 364/200 |

OTHER PUBLICATIONS

Birney et al., "Trace," *IBM T.D.B.*, vol. 20, No. 7, Dec. 1977, pp. 261-262.

*Primary Examiner*—Raulfe B. Zache
*Attorney, Agent, or Firm*—Daniel D. Dubosky

[57] ABSTRACT

A tracing facility which is useful in a multiprocessing environment on a single processor is disclosed. Tracing statements are encoded within each process, each statement having arguments to indicate its location in the code and a message which is logged when the sybsystem and function corresponding to that tracing statement are selected for debugging. Each process includes a trace library that is called by each trace statement, and the trace library includes a local sync word and a local trace table having a list of the subsystems and functions currently selected for tracing. Each process has access to a global sync word and a global trace table having a list of the processes, subsystems and functions selected for tracing. A change in the trace operation is made by changing a parameter in the global trace table and changing the value of the global sync word to indicate that a change has been made in the global table. Each call to the trace library causes a comparison to be made between the local sync word and the global sync word to determine whether the local trace table should be updated from parameters in the global trace table. Each trace statement also has an argument that indicates its level of importance in the debugging operation, and both tables are caused to have a parameter which indicates the level at which trace statements are currently required to be logged.

12 Claims, 6 Drawing Figures

TRACE FACILITY FOR USE IN MULTIPROCESSING ENVIRONMENT

BACKGROUND OF THE INVENTION

The development of software in computer based systems has become very time-consuming and, therefore, an expensive part of the initial cost of these systems. One difficulty is that many of the transactions between various pieces of software are not fully tested at the time the software is written. Accordingly, running the software causes logic errors to occur that are unexpected and these errors frequently produce undesirable results. These unexpected logic errors and undesirable results are frequently said to be due to bugs in the software.

One technique for locating the bugs in software is to intersperse coded statements within the software that provide the developer with an indication as to what values key parameters have during the execution of the software at the various points in the software at which the coded statements are inserted. The parameter values provided in this way will frequently provide the developer with an indication as to what is wrong with the present state of the software. These debugging statements frequently referred to as tracing statements take time to execute, and if a large number of them are interspersed within the code, the execution time for a particular piece of software can be increased significantly. It is therefore desirable to have only those tracing statements which are essential to a particular debugging operation to be executed. Inasmuch as there is usually no foresight as to which part of the software code or which function within the code will experience difficulties in execution, the tracing statements are usually interspersed at all points in a process that will be expected to give useful output parameters. This is found to be far more efficient than subsequently inserting statements only in the portions of code that are presently experiencing difficulties. The latter procedure would require constant rewriting of the source code and recompilation of that code every time a new bug is uncovered.

With trace statements interspersed throughout the code, it is desirable to have some way of deactivating the trace statements that are not presently required. One technique of achieving this mode of operation is to cause each tracing statement to contain arguments which indicate the subsystem and function with which it is associated in the code and to have a table loaded at the beginning of the process execution which specifies the subsystems and functions within the code presently requiring tracing. The inclusion of a subsystem or function within the table will cause the trace statements associated with those subsystems and functions to produce an output of the parameters specified in the trace statement. One difficulty with this approach is that the table must be changed in order to change the subsystem or function under investigation and the process must then be rerun from its starting point. This approach is especially difficult in cases where the processes execute over long periods of time. For example, in a communication system where there are many interrelated processes that are executed and continue to live while the system is active, a change in the table would require that the entire system be deactivated while a change be made in the table of each process. The system would then have to be reinitialized by bringing up all the processes and thereby consuming a large amount of time solely for the purpose of debugging a new subsystem or function.

Still another approach to the selective activation of trace statements in a multiprocessing environment is to provide a global table rather than a local table within each process. This global table can be associated with an operating system which is present during the execution of every process in the system. One feature that may be used to construct a table in connection with the VAX11/780 computer from Digital Equipment Corporation is the "logical name table" associated with its VMS operating system. Each process during its execution may then check the subsystem name and function name within the logical name table in order to determine whether a particular trace statement should be executed. The difficulty with this approach is that accessing the logical name table in the operating system is far more time consuming than accessing a table within the process itself. In addition, the logical name table may frequently have a much larger number of entries than a local table within the process and for this reason requires even more time than access to a local table.

SUMMARY OF THE INVENTION

A highly efficient trace facility is provided in accordance with the present invention wherein a process in a multiprocessing environment has a trace library within which a local trace table provides a list of the subsystems and functions whose trace statements are to be activated during any execution of the process. A global trace table is also provided containing a list of the processes, subsystems and functions whose trace statements are to produce results during execution. The trace library also has a local sync word which can be compared to a global sync word in order to determine whether any changes had been made in the global table that have not yet been updated within the local table. Each call to the trace library of the process causes such a comparison to be made between the two sync words. If no difference exists the local table is used to determine whether that particular call to the trace library should result in the output of the parameters associated with that call. The parameters in the local table are therefore replaced by their values in the global table only when a difference is detected between the local sync word and the global sync word. As a result, the much longer period of time required for reading the global trace table is avoided except when changes are made in the global table.

It is a feature of the present invention that the global trace table and the local table in the trace library also include a level value. This level value permits different degrees of investigation into the operation of each process during development of the code. Each trace statement is assigned a value to indicate the degree of importance of that trace statement in the debugging of that process. Level 1 statements, for example, could be reserved for the trace statements that are essential in determining an overview of the operation of that process (for example, inputs to and outputs from the process). At the other extreme, a higher number level, level four for example, can be assigned to those trace statements which provide detailed information about the operation of the subroutines within the process. As a result, the trace facility can be caused to permeate the execution of the processes to varying degrees depending on the level assigned in the global trace table. This listing of processes, subsystems, functions and levels within a global trace table provides an extremely flexible debugging facility that can dynamically interact with the processes being run to a degree which varies with time depending on the level of investigation that is necessary in order to uncover the bug that is encountered.

BRIEF DESCRIPTION OF THE DRAWING

The invention will be more readily understood when the following detailed description is read in conjunction with the drawings wherein.

DETAILED DESCRIPTION

The present invention was implemented on a VAX11/780 computer runner processes that are useful in a communications environment. Many of the terms used in this specification are terms that are defined in the VAX hardware and software handbooks for the VAX11/750 and VAX11/780. See the VAX Hardware Handbook by Digital Equipment Corporation, copyright 1980 and the VAX Software Handbook by Digital Equipment Corporation, copyright 1981, both of which are incorporated by reference for the purpose of providing support for the many terms used in this specification.

Figure 1:
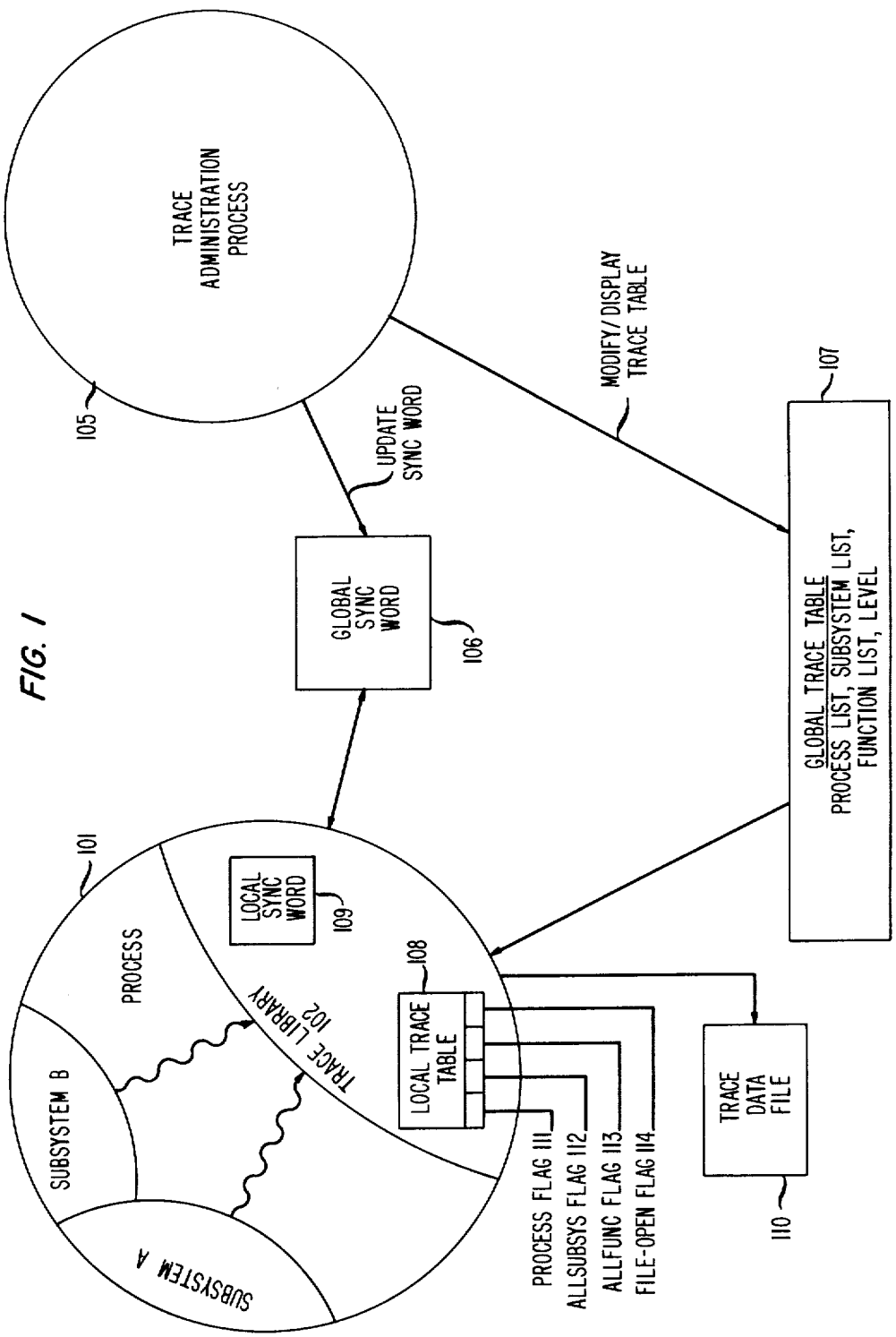
FIG. 1 is a block diagram which illustrates the relationship between a process and the global sync word and trace table on a processor which utilizes the present invention.

As pointed out in the handbooks, a process is the basic entity scheduled by system software that provides the context which an image executes. A process consists of an address space and both hardware and software contexts. As pointed out hereinabove, this invention is most useful in an environment where several processes are executing on a single central processing unit and these processes are long lived. Process 101 in FIG. 1 is representative of each of the processes operating in the multiprocessing environment. As also shown in FIG. 1, process 101 will frequently have several subsystems shown illustratively as subsystem A and subsystem B in FIG. 1. The subsystems of process 101 will have access to a trace library 102 which is the software that provides the heart of the present invention. This access is gained to the trace library by inserting statements in the software of the subsystems that call the trace library for execution of a debugging display. One format that a typical statement might take when written in the C language as defined in the text "The C Programming Language" by B. W. Kernighan and D. M. Ritchie, Prentice-Hall, Inc., 1978, is as follows:

trace(subsys_name, function_name, level, format_string, arg1, arg2, ...).

In this statement, the portion within the parenthesis represents arguments in a call to the trace routine. The subsys_name argument represents the name of a subsystem within the process. This subsystem name used as the first argument in a trace call in the embodiment constructed is simply a two-character prefix that is assigned to the subsystem and is unique for each identical subsystem in the many processes run in the multiprocessing environment. The next argument function_name is supplied by the caller and will permit the caller to uniquely identify some segment of his subsystem. There should, of course, be some consistent strategy used in designating this argument in order to avoid confusion either within the process or from process to process in the total environment. The third argument is a trace level which, in the embodiment constructed, was given any one of four levels, TRLEV_ONE THROUGH TRLEV_FOUR. The lowest trace level was used to identify entries to or from major routines of the subsystem whereas the higher level trace calls were used for information that was embedded in lower level routines. As will be apparent hereinafter, when a particular trace level is turned ON in the sense that it will produce a trace information output, all levels at or below the specified level are also caused to produce information output. That is, of course, providing the particular process, subsystem and function specified in the trace call are also turned on in the sense that an information output should be provided.

A typical use of a trace statement is illustrated in the following C language statement:

if (dept_no<0||dept_no>9999){trace ("mm", "label", TRLEV_TWO, "Bad department number=%d", dept_no)}

In this particular statement, a check is made to determine whether the specified department number indicated by dept_no is less than 0 or greater than 9999. If this condition is satisfied, a call is made to the trace library and this call specifies to the library that the call is being made from a function entitled "label" in a subsystem entitled "mm" with a trace level of 2. If this subsystem and function are ones that are presently specified as being on in the sense that they will produce an information output and further if the trace level is presently set to a level of 1 or 2, a department number of 10,000, for example, would produce an output either in a file or display with the information "Bad department number=10,000".

As indicated in FIG. 1, the multiprocessing environment also includes a trace administration process 105 whose sole function is to update a global sync word 106 in that it increments its value and to modify and/or display a global trace table 107. Both the global sync word 106 and the global trace table 107 can be created during an initialization process by using facilities available in the VMS operating system of the VAX11/780 which facilities are clearly specified in the above-identified VAX hardware and software handbooks. In the embodiment constructed the global trace table 107 was created during an initialization through use of the "logical name table" provided by VMS. As shown in FIG. 1, this global trace table 107 is caused to include a process list, subsystem list, function list and level. A process, subsystem or function is included in the list only if the specified function, subsystem and process are intended to produce information outputs during a trace call. Hence only the items included in the list are considered to be ON. The level is, of course, any one of the levels specified hereinabove which will cause statements at various levels within the software to produce information outputs.

In the embodiment which was constructed each of the lists was permitted to include a single name "all" to indicate that all of the items encountered should produce information output statements. In addition, the specification of "all" was permitted to be followed by a list of items, each one of which is prefixed by an "!" to indicate items that should be excluded from the all inclusive "all" statement. Each of the lists were limited in the VAX11 780 to a total of 64 characters which is a VMS limit for the logical name table.

As indicated in FIG. 1, the parameters from the global trace table 107 are copied into a local trace table 108 within the trace library 102 on the first trace call execution. This local trace table 108 is accessed during all subsequent trace calls. If the trace parameters are modified in the global trace table 107 by the trace administration process 105, this process 105 also increments the global sync word 106. As will be apparent hereinafter in connection with the discussion of the flowchart shown in FIGS. 3-5, each call to the trace library causes a comparison to be made of the global sync word 106 to a local sync word 109. If the global sync word and local sync word differ, then the trace library is caused to get a new copy of the parameters in the global trace table 107.

If a call to the trace library 102 finds that all of its arguments are specified within the local trace table 108 either specifically or by inclusion by way of an "all" statement, and the trace level present within the table 108 is equal to or greater than the trace level specified in the call, the statement specified in the format string of the trace call will be coupled as an input to a trace data file 110 in FIG. 1. There is, of course, a trace data file for each of the processes executing on the single processor. By reading the trace data file associated with a given process it can be determined whether the expected parameters are being produced by the code of the process. As is well known to those skilled in the computing science art, this type of information is extremely useful in determining the location of bugs within the software.

The nature of the software used to provide the trace library function is illustrated by the flowchart shown in FIGS. 3-7. As indicated in step 301 of FIG. 3, entry to the trace library immediately causes a comparison to be made between the local sync word 109 and the global sync word 106. If these words are equal in value, it is known that the local trace table has parameters that correspond exactly to the parameters contained in the global trace table, and therefore the software may immediately jump to a point designated as A in FIG. 5 at which point the determination as to whether or not that particular trace call should produce an information output is begun. For the moment assume that these two sync words are not equal in value. This causes the software to first set them equal in value as indicated by step 302 in FIG. 3 and then the local trace table receives a copy of the global trace table as indicated by the step 303 in FIG. 3. A determination is then made as to whether the process name is in the process list as indicated by the decision step 304 in FIG. 3. If the process name is not in the process list of the table, the process flag is set to its false state, and a determination is then made as to whether the file-open flag is set as indicated by decision step 306 in FIG. 3. If the file-open flag 114 is not set thereby indicating that the trace data file 110 is not open, there is an immediate return from the trace library routine. If on th other hand it is set, the trace data file is closed as indicated by step 307 in FIG. 3, and the flag is set to its false condition before returning from the trace library.

Figure 3:
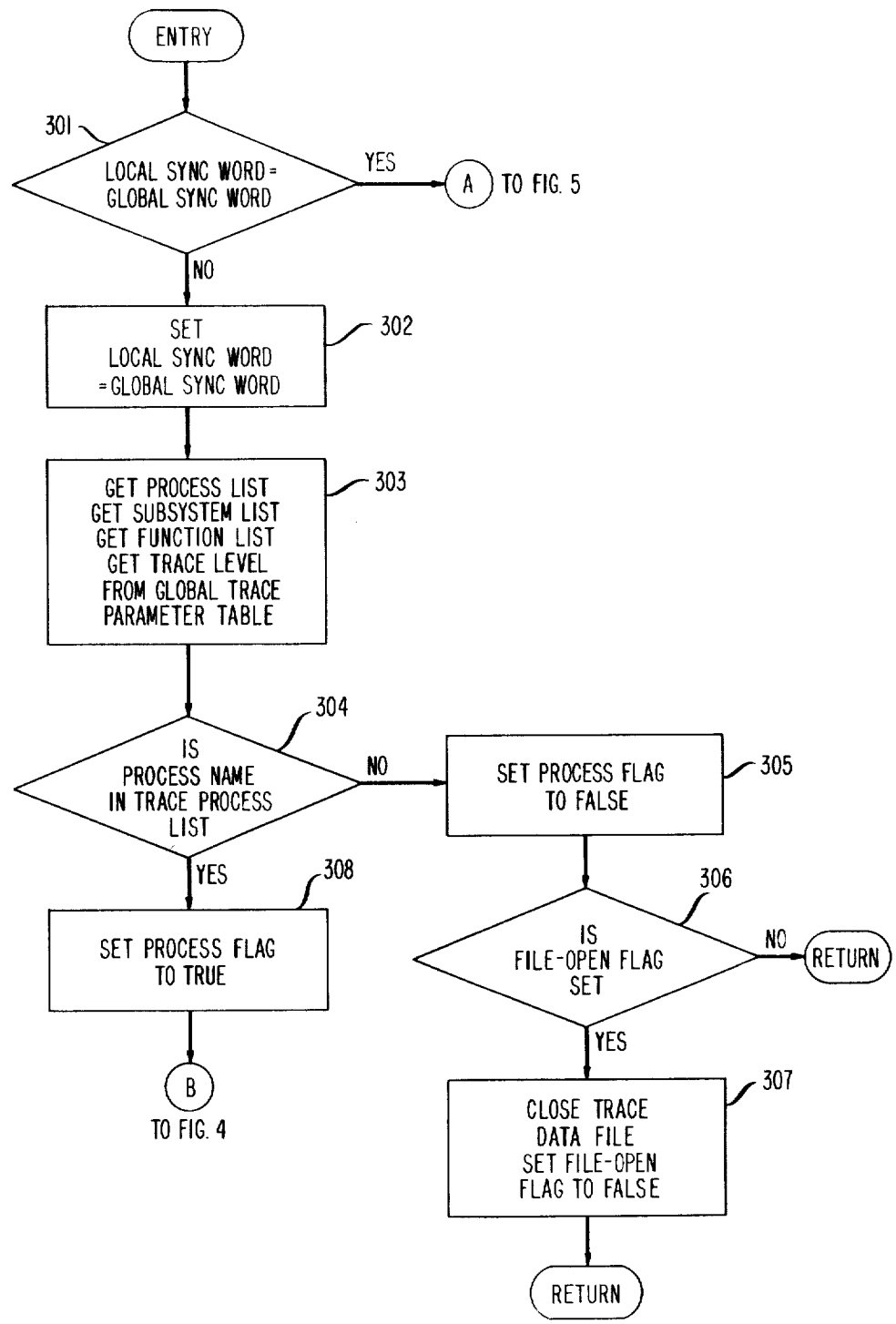
FIGS. 3 through 6 provide a flowchart for a process which practices the present invention.
Figure 4:
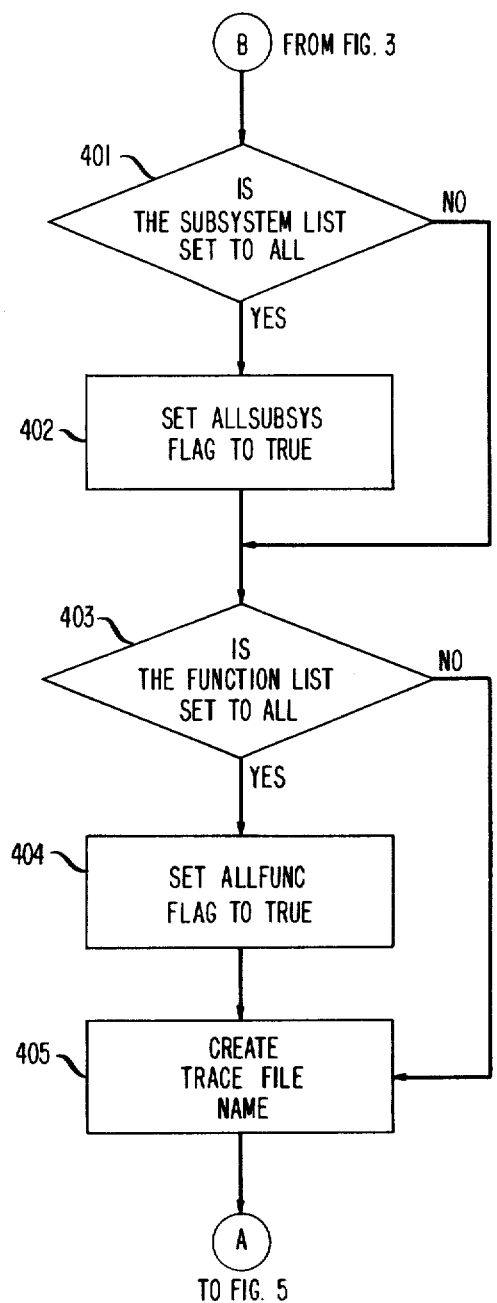

If, on the other hand, the process name is in the process list of the local trace table, the process flag 111 is set to its true condition as indicated by step 308 in FIG. 3, and a determination is then made by step 401 in FIG. 4 as to whether the subsystem limit begins with an "all" statement. If the subsystem list does not begin with the statement "all", the software immediately proceeds to step 403 in FIG. 4 to determine whether the function list begins with the statement "all". If the subsystem list does begin with the statement "all", the allsubsys flag 112 is first set to its true condition before a test is made on the function list. Similarly, if the function list begins with the statement "all", the allfunc flag 113 is set to its true condition in step 404. The trace data file name is then created in step 405 with a name that uniquely identifies the process that will be providing information to the data file. The trace file itself is not created until the first trace record is generated. This prevents the proliferation of "empty" files when tracing is not enabled.

Figure 5:
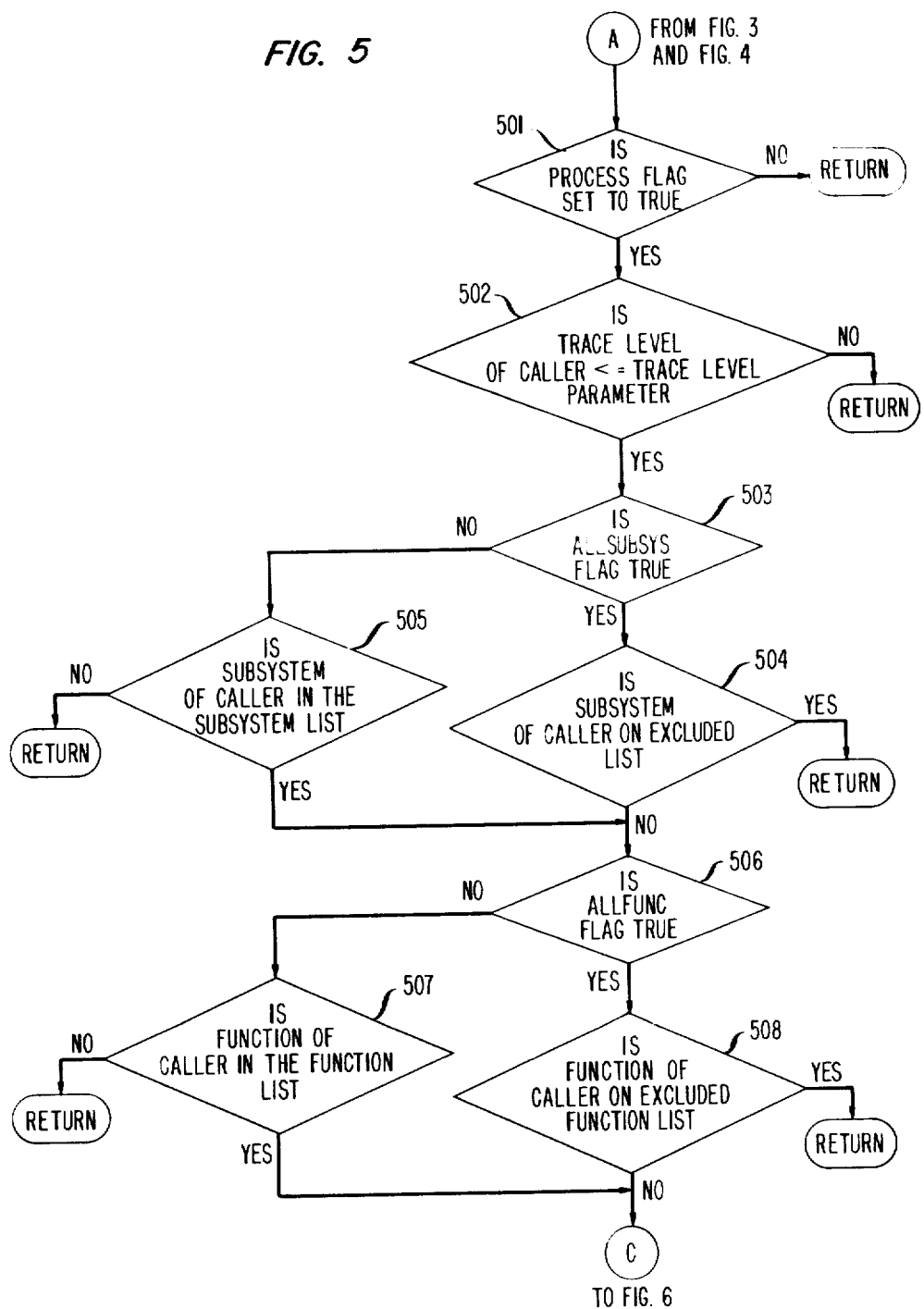

After the construction of the data file name in step 405 or if the local sync word equals the global sync word in step 301, the trace library software then provides a decision in step 501 of FIG. 5 to determine whether the process flag is set to its true state. If it is not, this indicates that the process is not currently undergoing debugging and therefore an immediate return should be made from the trace library. If on the other hand the process flag is set to its true condition as determined by decision step 501 in FIG. 5, a decision is then made in step 502 as to whether the trace level of the calling code is less than or equal to the trace level present in the local trace table 108. If the trace level of the calling code is greater than the trace level specified in the table, a return is executed from the trace library. This could correspond to a condition where only major parts of the code are undergoing debugging and the deeply embedded parts of the code are permitted to execute without producing output information in order to reduce overhead on the system.

If the trace level of the calling code is less than or equal to the trace level present in the trace table a decision is then made as to whether the allsubsys flag is true, as indicated by decision step 503 in FIG. 5. If it is set to its true condition, a determination is then made in step 504 as to whether the subsystem specified in the calling code is in the excluded list that follows an "all" statement. If it is so excluded, an immediate return is made from the trace library. If it is not, the code proceeds to decision statement 506 in FIG. 5. If the allsubsys flag is not set to it true state, a determination is made as to whether the subsystem is specifically included in the subsystem list of the local trace table in decision step 505. If it is not, an immediate return is made from the trace library. If it is so included, software proceeds to decision step 506. This step determines whether the allfunc flag is set to its true condition. If it is, a determination is made as indicated by decision step 508 as to whether the function is specifically excluded. If it is excluded, there is an immediate return. If it is not, the code proceeds to point C at which point it is ready to provide information output relating to this trace call. If the allfunc flag is not set to its true condition, a determination is first made as indicated by decision step 507 as to whether or not the function is specifically included in the function list. If it is not, there is an immediate return from the trace library. If it is specifically included, the code also proceeds to point C at which point information output is to be generated.

Figure 6:
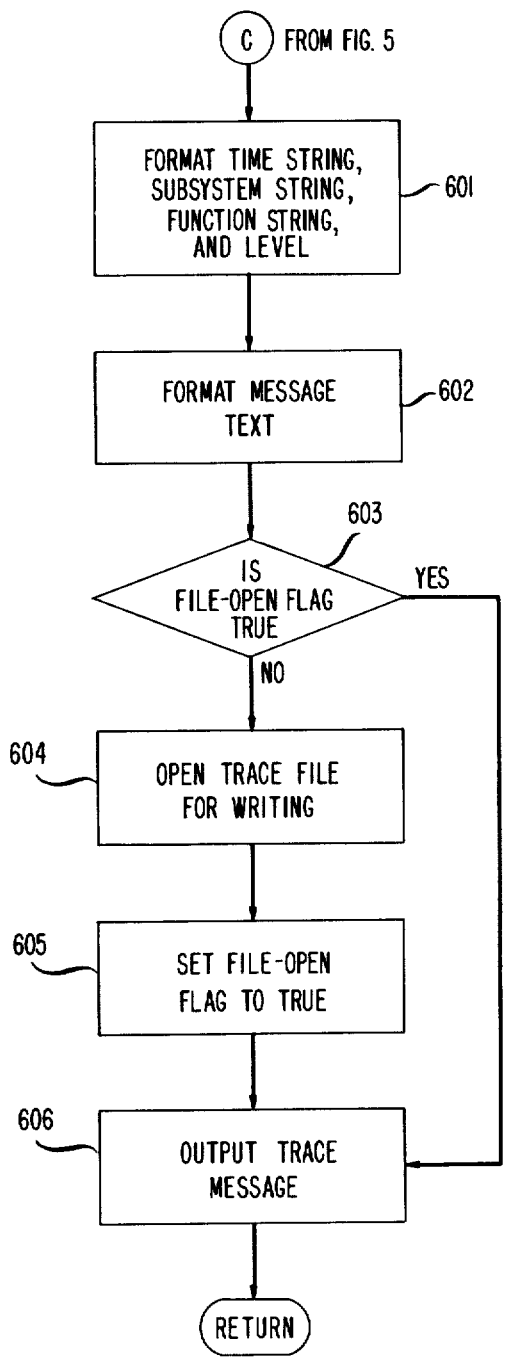

At point C in the software, the code of the trace library causes a string to be formatted that includes the time on the system, the subsystem and function that are presently causing an output to be executed to the trace data file, and the trace level that corresponds to the calling trace code as indicated by step 601 in FIG. 6. The message text present in the calling trace statement is then formatted as indicated by step 602 in FIG. 6. This formatting of the message text usually includes the replacement of token words that are present in the calling code with definitions that correspond to the particular situation encountered by this code. For example, in the above illustrated trace statement relating to a particular department number, the specific department number that was encountered by the code is included within the message text.

The code of the trace library then makes a determination as indicated by decision step 603 in FIG. 6 as to whether or not a file is open to receive the trace data. If it is, the trace message is immediately coupled to that file by way of a code that is represented by step 606. If the file is not open, however, a file is first opened as indicated by step 604 and the file-open flag 114 is set to its true condition as indicated by step 605 prior to outputting a trace message. After the message is delivered to the data file there is a return from the trace library as indicated in FIG. 6.

Figure 2:
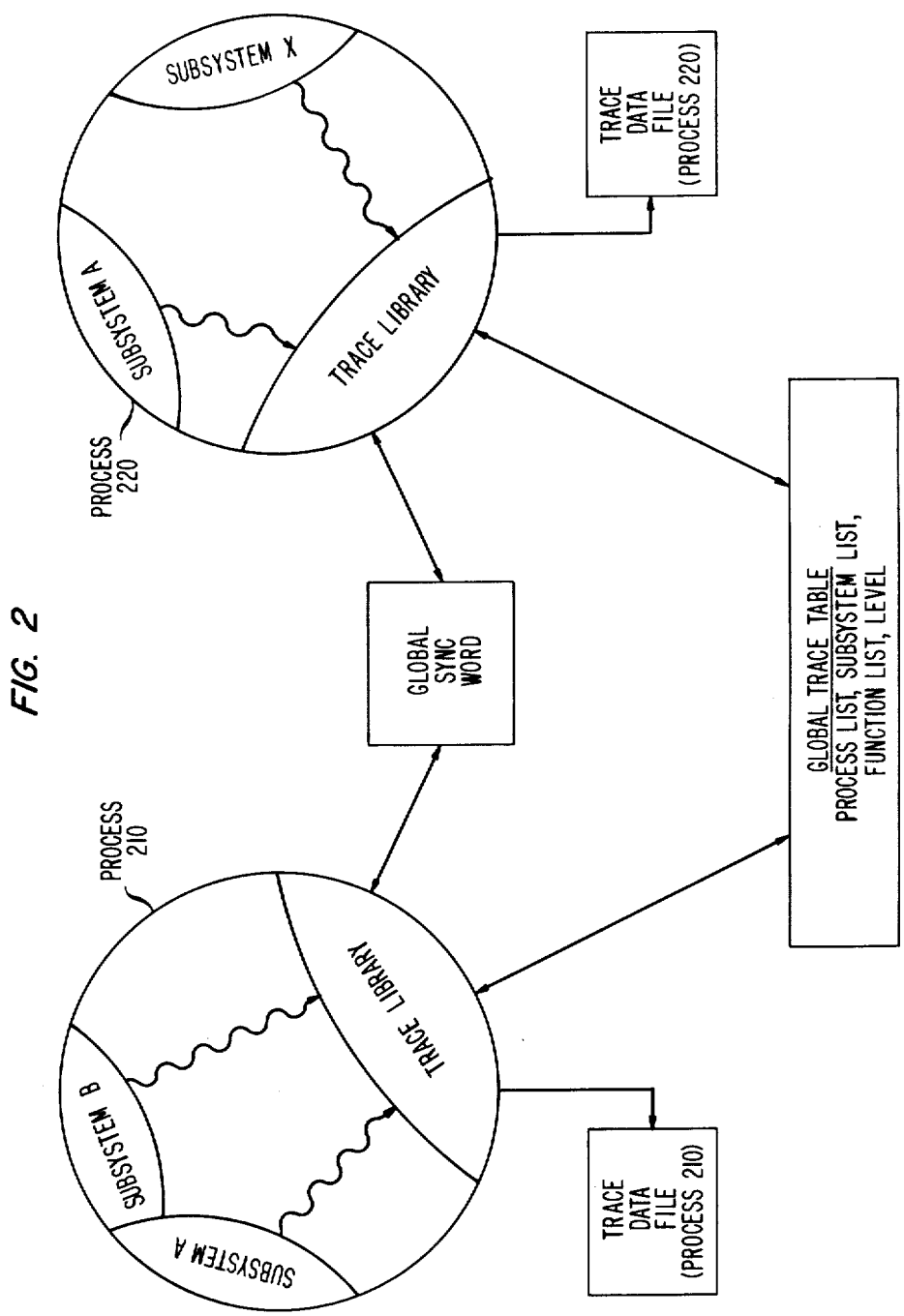
FIG. 2 is a block diagram which illustrates how two processes on a single processor utilize the global sync word and trace table during their execution on a single processor which utilizes the present invention.

At this point the properties of the trace library should be evident and the dynamics of its use in a multiprocessing environment can be illustrated by the diagram presented in FIG. 2. As indicated in FIG. 2, several processes in a multiprocessing environment, only two of which are shown as process 210 and 220, can be simultaneously providing outputs from their trace library to trace data files that are uniquely associated with each of the processes. The overall action of the debugging process for the individual processor, however, is controlled by the global trace table which is present in the processor at a point in its memory that is available to all operating processes. As indicated hereinabove, the present embodiment includes a global trace table within the part of the memory that is allocated to the VMS operating system. The global sync word is also present in a portion of memory that is available to each of the processes. All of the processes in this multiprocessing environment can continue to execute without re-initialization even though they are taken in and out of the debugging process. The parameters of the global trace table are simply changed in order to exclude or include specific processes or to include or exclude subsystems and functions within those processes. Finally, the intensity of the debugging and therefore the time consumed on the processor by the debugging trace facility can be changed by modifying the trace level within the global trace table. The trace facility can be completely deactivated by excluding all active processes from the process list. In summary, the present invention provides a trace facility that can dynamically interact with continuously executing processes in a multiprocessing environment by permeating the code of these processes to varying degrees depending on the parameters specified in the global trace table.

It should be readily apparent to those skilled in the art that numerous changes can be made in the present embodiment without departing from the spirit and scope of the present invention. For example, the information provided as an output from the trace library may also be delivered to a terminal in addition to, or in place of, the trace data file. The global and local trace tables may also include other lists that permit further specification of the kind of code that is to cause an output from the trace facility. Obviously, additional levels may also be included in order to change the degrees to which the tracing facility is permitted to permeate the processes operating in the multiprocessing environment.

What is claimed is:

1. In a multiprocessing computer environment wherein several processes are simultaneously executing on a single processor, at least one process having calls to a trace library to provide an output when the arguments accompanying a call satisfy a predetermined criteria with respect to parameters within a table that is local to said at least one process, a computer method of controlling the execution of the trace statements within said at least one process comprising the steps of comparing a local word within the process with a global word available to all processes, and replacing the parameters in the local table with their corresponding values from a global table that is available to all processes in response to an indication that a difference exists between said local word and said global word.

2. A computer method as defined in claim 1 wherein the global table includes a list of processes that are to be acted upon by said trace facility and each process includes a process flag, the method further including the steps of comparing the calling process name to the processes present in the process list, and setting the process flag to a predefined condition if the process name is present in the process list.

3. A computer method as defined in claim 2 wherein each local and global table further includes a trace level parameter, and each call to the trace library further includes a level-indicating argument, the method further including the steps of comparing the level-indicating argument in the calling code to the trace level parameter present in the local table, and returning without producing an output from the trace library when the comparison to the trace level parameter indicates a predetermined relationship.

4. A method for operating a tracing facility within a multiprocessing computer environment wherein each of several processes has a trace library that includes a local sync word and a local trace table and the processor environment includes a global sync word and a global trace table that are available to each of the processes operating in the multiprocessing environment, both local trace table and global trace table including a list of parameters that indicate which encoded trace statements are to be acted upon, said method comprising the steps of comparing the local sync word with the global sync word, and replacing the parameters of the local trace table with their equivalent values from the parameters in the global trace table in response to an indication by the comparison of the local sync word and global sync word that a predetermined difference exists between the two sync words.

5. A computer method as defined in claim 4 wherein each process includes a process flag and the method further includes the additional steps of comparing the process name with the parameters listed in said local trace table to determine whether the process is included within those parameters, and setting the process flag to a predetermined state if the comparison determines that the process name is present within those parameters.

6. A computer method as defined in claim 4 wherein each local trace table and the global trace table includes a parameter to indicate a trace level and each calling code to the trace facility includes a level-indicating argument, the computer method further including the steps of comparing the trace level indicated in the calling code to the trace level present as a parameter in the local trace table, and terminating the trace call without producing an information output if a predetermined condition is found to exist in the comparison of the two trace levels.

7. The method of operating a tracing facility wherein tracing information is provided by trace statements that are encoded within a process operating in a computer environment, said process including a local syn word and a local trace table, each of said encoded trace statements having at least one argument which is compared to parameters in said local table in order to determine whether that trace statement should produce tracing information, and the software environment common to all processes operating in said computer environment includes a global sync word and a global trace table, said method comprising the steps of comparing the local sync word with the global sync word to determine if a predetermined difference exists, and replacing the parameters present in the local trace table with parameters from the global trace table if the predetermined difference is determined to exist.

8. The method of operating a tracing facility as defined in claim 7 wherein said process also includes a process flag which indicates by its state whether or not that process is to be included in the tracing operation, and the method further includes the steps of comparing the name of said process to a list of processes that is derived from said global trace table, and setting the state of the process flag in response to the comparison between said process name and the list of processes in the global trace table.

9. The method of operating a tracing facility as defined in claim 8 wherein said global trace table and said local trace table each include a parameter to indicate the level of tracing and the method further includes the steps of comparing the level in the local trace table with the level indicated in the global trace table to determine whether a particular encoded tracing statement should cause the generation of tracing information.

10. A combination for selectively providing output information from trace statements that are encoded into at least one process in a multiprocessing computer environment comprising means within said at least one process for storing a local sync word, means within said at least oe process for storing a local table of parameters which determine which of the encoded tracing statements are to produce output information, means available to each of the processes in said multiprocessing environment for storing a global sync word, means available to each of said processes in said multiprocessing environment for storing a global table of parameters at least some of which are equivalent to the parameters in said local table, means for comparing the value of said local sync word with the value of said global sync word, means responsive to said comparing means for copying the parameters from said global table into said local table, and means for modifying the parameters in said global table and the value of said global sync word.

11. A combination as defined in claim 10 wherein said at least one process further includes means for storing a process flag which indicates by its state whether or not the encoded trace statements in said at least one process will produce output information.

12. A combination as defined in claim 11 wherein said at least one process further includes means for storing an all subsystem flag which indicates by its state whether or not all of the subsystems within said at least one process are to provide output tracing information.

* * * * *

UNITED STATES PATENT AND TRADEMARK OFFICE
CERTIFICATE OF CORRECTION

PATENT NO. : 4,462,077

DATED : July 24, 1984

INVENTOR(S) : Harold L. York

It is certified that error appears in the above-identified patent and that said Letters Patent is hereby corrected as shown below:

```
Column 4, line 10, "THROUGH" should read --through--.
Column 5, line 15, "3-5" should read --3-6--.  Column 10,
line 12, "oe" should read --one--.
```

Signed and Sealed this

Nineteenth Day of March 1985

[SEAL]

Attest:

DONALD J. QUIGG

Attesting Officer

Acting Commissioner of Patents and Trademarks